(12) United States Patent
Kaliamoorthi et al.

(10) Patent No.: US 10,334,308 B2
(45) Date of Patent: *Jun. 25, 2019

(54) METHOD AND APPARATUS TO CREATE INTUITIVE FAVORITES FOR USERS

(71) Applicant: Nagravision S.A., Cheseaux-sur-Lausanne (CH)

(72) Inventors: Amudha Kaliamoorthi, Bangalore (IN); Dharmveer Lakshmi Sharan Lal, Bangalore (IN)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,889

(22) Filed: Feb. 13, 2018

(65) Prior Publication Data

US 2018/0220184 A1 Aug. 2, 2018

Related U.S. Application Data

(63) Continuation of application No. 15/009,651, filed on Jan. 28, 2016, now Pat. No. 9,912,980.

(51) Int. Cl.
*G06F 16/78* (2019.01)
*H04N 21/45* (2011.01)
(Continued)

(52) U.S. Cl.
CPC ....... *H04N 21/4312* (2013.01); *G06F 3/0482* (2013.01); *G06F 16/78* (2019.01);
(Continued)

(58) Field of Classification Search
CPC ......... H04N 21/42201; H04N 21/4394; H04N 21/44008
See application file for complete search history.

(56) References Cited

U.S. PATENT DOCUMENTS 6,075,526 A 6/2000 Rothmuller
8,024,756 B2 9/2011 Friedlander et al.
(Continued)

FOREIGN PATENT DOCUMENTS

EP 2779676 A1 9/2014

OTHER PUBLICATIONS

"International Application Serial No. PCT IB2017 000113, International Preliminary Report on Patentability dated Aug. 9, 2018", 9 pgs.
(Continued)

*Primary Examiner* — Nasser M Goodarzi
*Assistant Examiner* — Adil Ocak
(74) *Attorney, Agent, or Firm* — Schwegman Lundberg & Woessner, P.A.

(57) ABSTRACT

Example embodiments provide systems and methods for dynamically creating intuitive favorites for a user. The system and methods include monitoring actions performed, by the user at a digital receiver, with respect to a plurality of content programs. The actions performed with respect to the plurality of content programs are analyzed. The analysis includes comparing a level of the actions with respect to a first content program of the plurality of content programs with a threshold. Based on the comparing indicating that the first content program is a favorites, an indication that the first content program is a favorites content program is stored to a data store.

20 Claims, 5 Drawing Sheets

(51) Int. Cl.
  *H04N 21/84* (2011.01)
  *G06F 3/0482* (2013.01)
  *H04N 21/258* (2011.01)
  *H04N 21/431* (2011.01)
  *H04N 21/442* (2011.01)
  *H04N 21/488* (2011.01)
  *G06F 16/9535* (2019.01)
  *H04N 21/4147* (2011.01)

(52) U.S. Cl.
  CPC ... *G06F 16/9535* (2019.01); *H04N 21/25891* (2013.01); *H04N 21/4147* (2013.01); *H04N 21/442* (2013.01); *H04N 21/4532* (2013.01); *H04N 21/4882* (2013.01); *H04N 21/84* (2013.01)

(56) References Cited

U.S. PATENT DOCUMENTS

| | | |
|---|---|---|
| 8,046,793 B2 | 10/2011 | Li et al. |
| 8,171,515 B2 | 5/2012 | Schwesinger et al. |
| 9,912,980 B2 | 3/2018 | Kaliamoorthi et al. |
| 2002/0053084 A1 | 5/2002 | Escobar et al. |
| 2007/0118848 A1* | 5/2007 | Schwesinger ......... H04H 60/33 725/9 |
| 2007/0288309 A1 | 12/2007 | Haberman et al. |
| 2008/0082999 A1 | 4/2008 | Hamada et al. |
| 2010/0162317 A1* | 6/2010 | Xu ................. H04N 5/44543 725/46 |
| 2011/0258154 A1 | 10/2011 | Koppula |
| 2012/0210224 A1 | 8/2012 | Wong et al. |
| 2013/0305287 A1 | 11/2013 | Wong et al. |
| 2017/0223406 A1 | 8/2017 | Kaliamoorthi et al. |

OTHER PUBLICATIONS

"International Application Serial No. PCT/IB2017/000113, International Search Report dated Jul. 12, 2017", 5 pgs.

"International Application Serial No. PCT/IB2017/000113, Written Opinion dated Jul. 12, 2017", 8 pgs.

"U.S. Appl. No. 15/009,651, Non Final Office Action dated Mar. 27, 2017", 25 pgs.

"U.S. Appl. No. 15/009,651, Notice of Allowance dated Oct. 20, 2017", 8 pgs.

"U.S. Appl. No. 15/009,651, Response filed Jul. 5, 2017 to Non Final Office Action dated Mar. 27, 2017", 11 pgs.

"European Application Serial No. 17731626.2 Response filed Mar. 14, 2019 to Communication pursuant to Rules 161(2) and 162 EPC dated Nov. 26, 2018", 24 pgs.

\* cited by examiner

METHOD AND APPARATUS TO CREATE INTUITIVE FAVORITES FOR USERS

CROSS-REFERENCE TO RELATED APPLICATION

This application is a continuation of U.S. patent application Ser. No. 15/009,651, filed on Jan. 28, 2016, which is incorporated herein by reference in its entirety.

FIELD

The present disclosure relates generally to digital content monitoring and, in a specific example embodiment, to mechanisms and processes for dynamically creating digital content favorites for a user.

BACKGROUND

There is a universe of content available through a television operator's platform including live television and on-demand content (e.g., content stored on a personal video recorder (PVR), content sourced from third parties, Internet streamed videos (e.g., YouTube), and so on). Conventionally, a user must manually create and maintain their own favorites list (e.g., programs or content favorites). Once created, the favorites list is visible to any individual using the same system (e.g., digital receiver, set-top box, or remote control unit). As such, a favorites list for a first user (e.g., an adult) at the system may not be suitable for a second user at the same system (e.g., a child), but is still visible to the second user.

BRIEF DESCRIPTION OF DRAWINGS

Various ones of the appended drawings merely illustrate example embodiments of the present invention and cannot be considered as limiting its scope.

DETAILED DESCRIPTION

Figure 1:
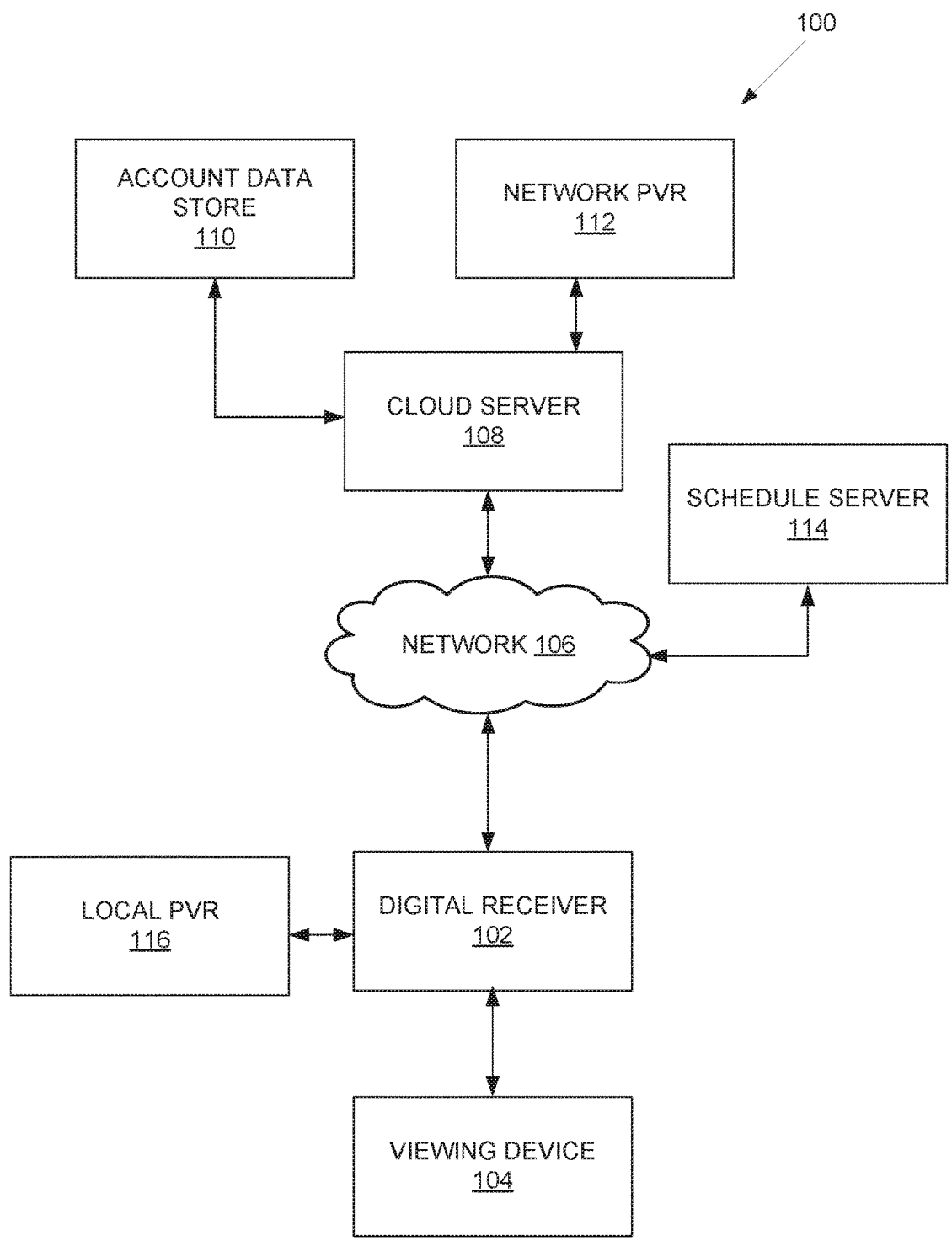
FIG. 1 is a diagram illustrating an example environment for dynamically creating intuitive favorites for a user.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail.

Example embodiments described herein provide systems and methods for automatically and dynamically creating intuitive favorites of content programs (herein referred to as "favorites" or "content program favorites") for a user. In particular, example embodiments provide mechanisms and logic that monitor actions performed, by the user at a digital receiver, with respect to a plurality of content programs. In example embodiments, content programs may comprises multiple episodes. The actions comprise various commands that are received from the user with respect to the plurality of content programs. Example commands include a view command to view one or more of the plurality of content programs; a recording command to record one or more of the plurality of content programs; a command to set a reminder to view one or more of the plurality of content programs; a command to search or browse for one or more of the plurality of content programs; and a command to purchase or subscribe to one or more of the plurality of content programs.

The actions performed with respect to the plurality of content programs are analyzed. The analysis includes comparing a level of the actions over a predetermined period of time with respect to a content program of the plurality of content programs to a threshold. Accordingly, the level of the actions may comprise an amount of time that a particular command is in effect with respect to the content program (e.g., an amount of time a view command is in effect indicating a length of time the content program was viewed, an amount of time a search result/browse result is viewed based on a command to search or browse), or a number of times that a particular command is selected with respect to the content program (e.g., a number of times a record command is received for the content program, a number of times a command to set a reminder to view the content program is received, or a number of times a command to purchase or subscribe to the content program is received). Based on the comparison indicating that the first content program is a favorites (e.g., equal to or transgressing the threshold), an indication that the first content program is a favorites is stored to a data store. The data store is located at the digital receiver, a cloud server, or both.

The system and methods also provides a favorites list based on the indication stored in the data store. In example embodiments, a request for content program favorites is received from the user. In response, the indications of the favorites of the user are retrieved from the data store. Using the indications of the favorites, a favorites list is generated and caused to be presented to the user.

The digital receiver continually monitors the actions performed by the user at the digital receiver. Therefore, a change in the level of action with respect to content programs can occur. If a level of action with respect to a content program that was previously identified as a favorites is reduced such that a comparison with the threshold indicates the content program is no longer a favorites (e.g., no longer equal to or transgressing the threshold), the indication that the content program is a favorites is removed from the data store. As a result, a user's favorites may be dynamically updated whenever the analysis is performed. This results in a favorites list that is consistently up-to-date for the user.

As a result, one or more of the methodologies described herein facilitate solving the technical problem of automatically and dynamically creating intuitive favorites of content programs. The methodologies include monitoring user actions with respect to a plurality of content programs. The logic also dynamically analyzes the monitored user actions to determine which content programs are favorites based on a threshold (e.g., equal to or transgressing the threshold). As a result, one or more of the methodologies described herein may obviate a need for certain efforts or resources that otherwise would be involved in browsing for content or manually creating and maintaining a favorites list. Additionally, resources used by one or more machines, databases, or devices (e.g., within the environment) may be reduced. Examples of such computing resources include processor cycles, network traffic, memory usage, data storage capacity, power consumption, network bandwidth, and cooling capacity.

With reference to FIG. 1, a diagram illustrating an example environment 100 in which embodiments of a system for dynamically creating and maintaining content program favorites for a user is shown. In example embodiments, a digital receiver 102 of a user provides access to content programs. In one embodiment, the digital receiver 102 is a set-top box. The digital receiver 102 is coupled to a viewing device 104 (e.g., a television or monitor) on which the user can view the content programs as well as a favorites list. In some embodiments, the digital receiver 102 may be combined with the viewing device 106 (e.g., a smart television). Since the user accesses content programs through the digital receiver 102, the digital receiver 102 is configured to monitor actions performed by the user with respect to the content programs. The actions comprise various commands that are received from the user with respect to the plurality of content programs (e.g., commands to view the content programs; record the content programs; set reminders to view the content programs; purchase or subscribe to the content programs; browse or search for the content program, and any other actions performable at the digital receiver 102 with respect to the content programs).

In some embodiments, the digital receiver comprises logic to analyze the monitored actions to determine favorites (e.g., content program favorites) of the user. Indications of the favorites can be transmitted through a network 106 (e.g., the Internet, wireless network, cellular network, or a Wide Area Network (WAN)) to a cloud server 108 for networked storage. In example embodiments, the cloud server 108 manages an account associated with the digital receiver 102. The account comprises one or more user profiles, each user profile corresponding to a user of the digital receiver 102. Account information including the indication of favorites are stored in a user profile of the corresponding user in an account data store 110 that is coupled to (or resides within) the cloud server 108. Since a list of favorites (e.g., a list of the indications of the favorites) is maintained by the cloud sever 108, the user can access their list of favorites from any digital receiver.

In some embodiments, the digital receiver 102 accesses content programs from a network personal video recorder (network PVR) 112. The network PRV 112 is coupled via the cloud server 108 for access by the digital receiver 102. As such, in some embodiments, the cloud server 108 is also configured to monitor the actions of the user.

Further still, a schedule server 114 is coupled to the network 106 in some example embodiments. The schedule server 114 stores or provides access to content viewing schedules. The content viewing schedules may be used by the digital receiver 102 to determine actual content programs that the user is interacting with. For example, the digital receiver 102 may only know that the user is access channel 2 at 8 pm on Thursday. The digital receiver 102 accesses a content viewing schedule from the schedule server 114 and uses the content viewing schedule to identify the actual content program that corresponds to the channel and time.

In example embodiments, the environment 100 also includes a local PVR 116 coupled to the digital receiver 102. The local PVR 116 locally stores recorded content programs. Access of the locally recorded content programs, through the digital receiver 102, is also monitored by the digital receiver 102.

It is noted that the environment 100 shown in FIG. 1 is merely an example. For example, not all components of the environment 100 may be shown. Additionally, some components of the environment 100 may be combined. For instance, the account data store 110 may be embodied within the cloud server 108, or the digital receiver 102 and the viewing device 104 may be contained within a single device (e.g., a smart television). Furthermore, operations discussed as occurring at the digital receiver 102 may be performed at the cloud server 108. For example, the monitoring and analyzing, as will be discussed further below, may be performed at the cloud server 108.

Figure 2:
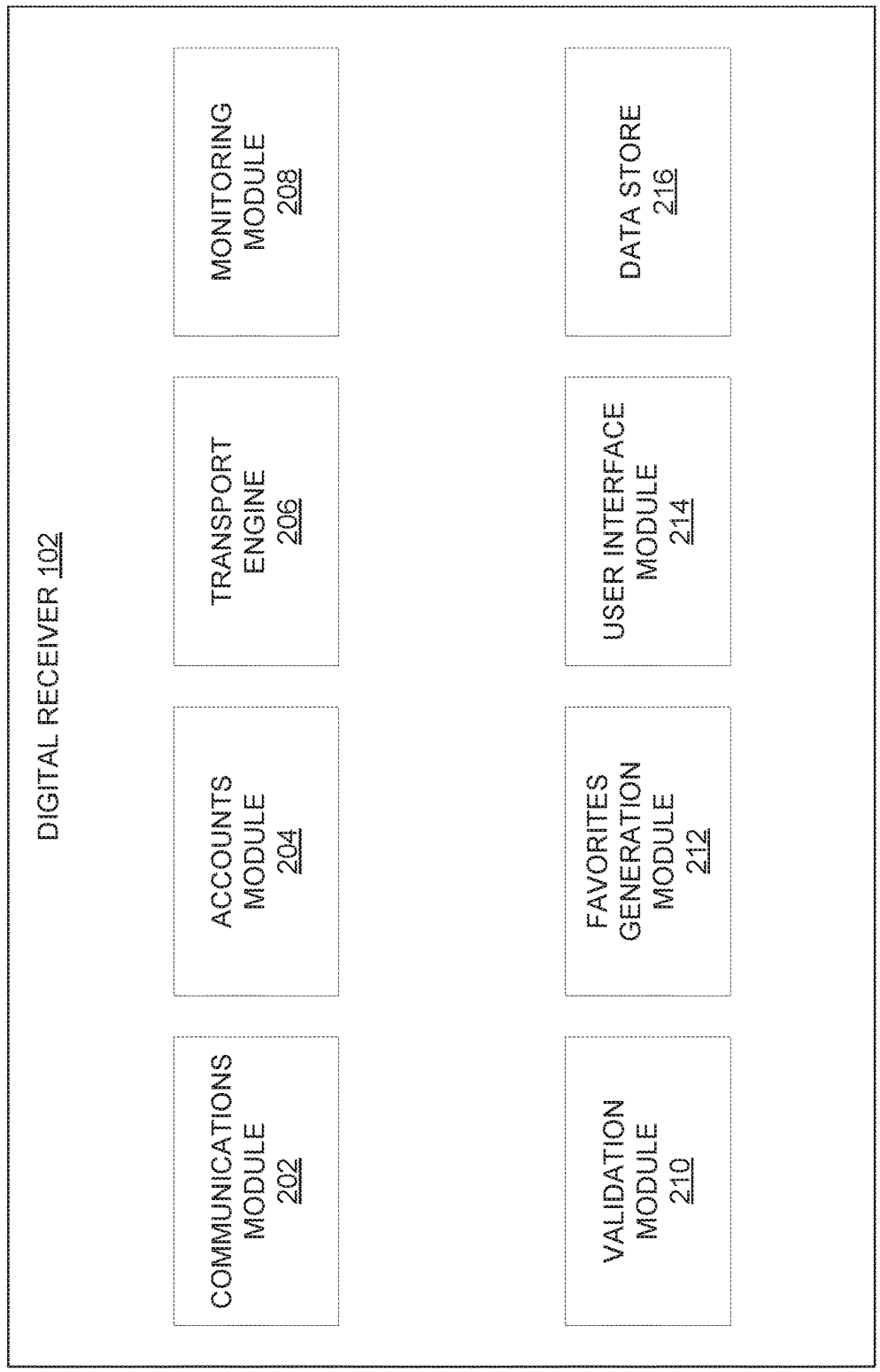
FIG. 2 is a block diagram illustrating an example embodiment of components within a digital receiver.

FIG. 2 is a block diagram illustrating an example embodiment of the digital receiver 102. The digital receiver 102 is configured to monitor user actions and interactions with content programs and to analyze the monitored information to determine favorites for the user. To enable these operations of the digital receiver 102 comprises a communications module 202, an accounts module 204, a transport engine 206, a monitoring module 208, a validation module 210, a favorites generations module 212, a user interface module 214, and a data store 216 communicatively coupled together. The digital receiver 102 may comprise other components not pertinent to example embodiments that are not shown or discussed. Furthermore, alternative embodiments may comprise more, less, multiples of, or other components. Additionally, some functions of the components may be combined or divided into two or more further components.

The communications module 202 manages data exchange between the digital receiver 102 and the other components of the environment 100 including the cloud server 108. For example, the digital receiver 102 communicates data indicating identified favorites to the cloud server 108 via the communications module 202. In another example, the digital receiver 102 retrieves indications of the favorites stored by the cloud server 108 using the communications module 202.

The accounts module 204 manages one or more accounts associated with the digital receiver 102. When the user initially interacts with the digital receiver 102, the user may first log into their account via the account module 204 to identify themselves to the digital receiver 102. By logging in, the user has access to their list of favorites either locally stored at the digital receiver 102 or at the cloud server 108. Additionally, any actions performed by the user can be monitored and associated with a user profile of the user in the account by the digital receiver 102.

The transport engine 206 manages channel tuning, recording, and other operations at the digital receiver 102. Accordingly, the transport engine 206 receives various commands, as discussed herein, from a user of the digital receiver 102 (e via a remote control). Based on the command, the transport engine 206 can change channels, record content programs, set reminders, search for content programs, and so forth.

The monitoring module 208 monitors or tracks actions performed by the user with respect to content programs. The actions comprise various commands that are received by the transport engine 206 from the user with respect to the plurality of content programs. Example commands include a view command to view one or more of the plurality of content programs; a recording command to record one or more of the plurality of content programs; a command to set a reminder to view one or more of the plurality of content programs; a command to search or browse for one or more of the plurality of content programs; and a command to purchase or subscribe to one or more of the plurality of content programs.

The monitoring module 208 also detects a duration of the actions. For example, the monitoring module 208 tracks not only the content program that corresponds to a view command, but also how long the view commend is in effect indicating how long a user is watching the content program). In another example, the monitoring module 208 tracks an amount of time a content program is browsed or an amount of time a content program in a search result is reviewed in response to a command to search or browse for content programs. Information obtained from the monitoring can be locally stored (or cached) or transmitted to the cloud server 108 for storage at the network account data store 110.

The validation module 210 is configured to perform analysis of the monitored information. In example embodiments, the validation module 210 identifies the content program associated with each action. For example, validation module 210, via the communications module 202, accesses or retrieves a content viewing schedule from the schedule server 114 and use the content viewing schedule to identify the content program.

In some embodiments, the validation module 210 aggregates the monitored information performed with respect to a same content program for a predetermined period of time (e.g., past month). The aggregated information will include an indication of a level of action performed with respect to the content program. For example, the level of action may be a number of minutes a view command is in effect for the content program (e.g., indicating an amount of time the content program or episodes of the content program were viewed), a number of times a record command was received for the content program, a number of times a command to purchase or subscribe to a content program was received, a number of minutes the content program was browsed in response to a command to browse, and so forth.

The level of action is then compared to one or more predetermined thresholds (e.g., to determine whether the threshold is transgressed or met). The predetermined thresholds may be obtained from the data store 216. For example, a first threshold comprises an amount of time that the view command was in effect over the predetermined period of time. If the view command was in effect for a longer amount of time than the first threshold, for example, the content program is identified as a favorites.

Other thresholds can be used and include a number of times a record command for the content program was received over a predetermined period of time, a number of times a command to set a reminder for the content program was received over a predetermined period of time, and a number of times a command to purchase or subscribe to the content program was received (e.g., to purchased five episodes of a particular content program) over a predetermined period of time. Additionally, a threshold based on a command to browse for content programs may be based on how long the user stayed on a particular content program or how frequently the user visits the content program, while a threshold based on a search command is based on how long the user spent reviewing a search result (e.g., an episode of a content program). The predetermined period of time for each threshold may differ. For example, the predetermined period of time for a viewing threshold may be one month, while a predetermined period of time for a recording threshold may be two months.

The favorites generation module 212 manages favorites (e.g., favorite content programs). In some embodiments, a transgression of (or being equal to) any of the thresholds, as determined by the validation module 210, triggers the favorites generation module 212 to mark content program as a favorites. In other example embodiments, a combination of transgressions of (or being equal to) thresholds is needed in order for the favorites generation module 212 to mark the content program as a favorites. For example, a record command for a particular content program transgresses (or is equal to) a recording threshold. However, the user may only end up viewing one recorded episode of the content program (e.g., only one view command received), which does not transgress (or is equal to) a viewing threshold. In this embodiment, the content program may not be marked as a favorites. Accordingly, various algorithms for determining whether a program content is a favorites may be stored in the data store 216 and applied by the validation module 210 and the favorites generation module 212. In one embodiment, application download/upgrades can be one criteria to determine application of an appropriate algorithm. Marking the content program as a favorites includes storing an indication that the content program is a favorites. The indication can be stored locally at the digital receiver 102 (e.g., in the data store 216) or stored remotely at the cloud server 108 (e.g., account data store 110).

The monitoring module 208 continually monitors the user's actions (e.g., the receipt of commands by the transport engine 206). Therefore, as the predetermined period of time (e.g., past month) shifts (e.g., by a two weeks), the validation module 210 uses the newly collected monitored information for analysis. This may result in a change in viewing, recording, reminder setting, browsing, searching, or purchase/subscription patterns for the user. For example, a level of action with respect to a content program may be reduced such that the level of action falls below the threshold. As a result, the content program that was previously indicated to be a favorites is no longer a favorites, and the indication that the content program is a favorites is removed for that content program in the data store 216 or account data store 110.

When a request for a favorites list is received from a user, the favorites generation module 212 access the stored indications of the favorites and generates the favorites list. In example embodiments, where the indications are not locally available at the digital receiver 102, the favorites generation module 212 accesses the indications stored by the cloud server 108 via the communications module 202. Thus, the favorites generation module 212 dynamically generates the favorites list based on the latest indications stored in a user profile of the user. Since the monitoring and analysis is continual, the favorites list may be continually changing and updated automatically by the system (e.g., the digital receiver 102).

The user interface module 214 generates and causes display of various user interfaces on the viewing device 104. The user interfaces may include an account login interface that allows the user to log into their account, a favorites request interface that allows the user to request a favorites list, and a favorites interface that displays the favorites list.

The user can also edit the favorites list via the user interface module 214. Since the favorites list is dynamically generated by the favorites generation module 212, the user may not agree with all the program contents listed on the favorites list. As such, the user may delete a program content, add a program content, or rearrange program content shown on the favorites list.

The data store 216 maintains local storage of data for the digital receiver 102. The data store 216 may store user profiles, monitored information, predetermined thresholds, and indications of favorites. Some of the data stored at the data store 216 may also be, or alternatively be, stored at the account data store 110 associated with the cloud server 108.

While various components are described as being a part of the digital receiver 102, in alternative embodiments, some of the components of the digital receiver 102 may be embodiments at the cloud server 108. For example, the cloud server 108 can comprise a monitoring module for monitoring actions performed by the user; a validation module to analyze the monitored information; or a favorites generation module to cause storage of indication of favorites or to generate a favorites list that is transmitted to the digital receiver 102 for presentation.

Figure 3:
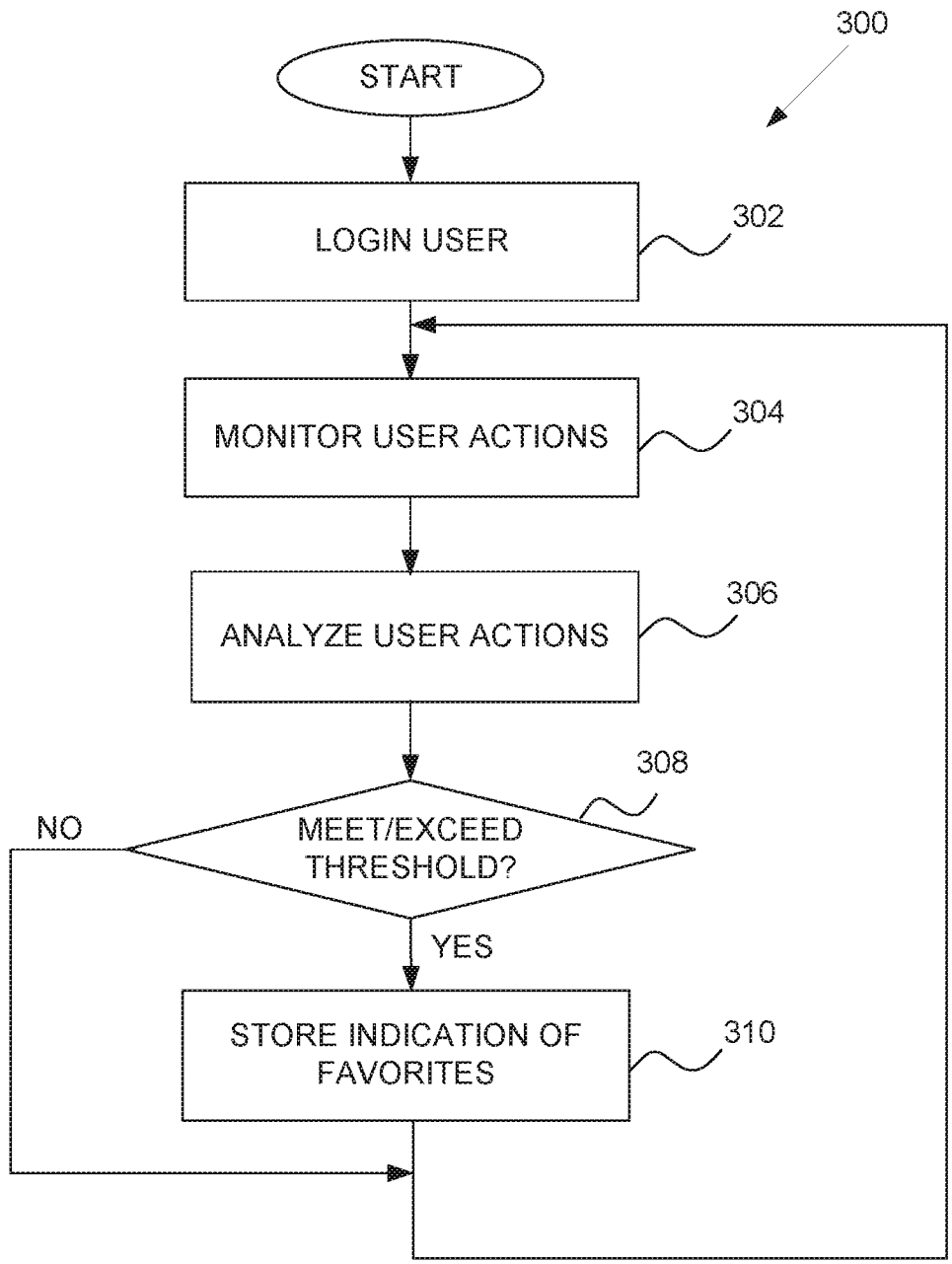
FIG. 3 is a flow diagram of an example method for dynamically creating intuitive favorites for a user.

FIG. 3 is a flow diagram of an example method 300 for dynamically creating intuitive favorites for a user. In some embodiments, the method 300 is performed in part or in whole by components of the digital receiver 102. Accordingly, the method 300 is described by way of example with reference to the digital receiver 102. However, it shall be appreciated that at least some of the operations of the method 300 may be deployed on various other hardware configurations or be performed by similar components residing on the cloud server 108. Therefore, the method 300 is not intended to be limited to the digital receiver 102.

In operation 302, the user logs in with (or otherwise identifies themselves to) the digital receiver 102 via the accounts module 204. In one embodiment, the user selects their profile from a list displayed by the digital receiver 102. The user may also be asked to provide login credentials (e.g., PIN, password). By logging in, any actions performed by the user can be monitored and associated with a user profile of the user by the digital receiver 102.

In operation 304, actions performed by the user with respect to content programs are monitored and tracked. In example embodiments, the monitoring module 208 monitors or tracks actions initiated by the user with respect to the content programs (e.g., via commands received by the transport engine 206). The actions comprise various commands that are received from the user with respect to the plurality of content programs. Example commands include a view command to view one or more of the plurality of content programs; a recording command to record one or more of the plurality of content programs; a command to set a reminder to view one or more of the plurality of content programs; a command to search or browse for one or more of the plurality of content programs; a command to purchase or subscribe to one or more of the plurality of content programs; or any other actions performable at the digital receiver 102 with respect to the content programs. The monitoring module 208 also detects a duration of the actions (e.g., duration of time, number of times).

In operation 306, the monitored information is analyzed. Operation 306 may occur periodically at a predetermined interval (e.g., monthly, weekly), based on one or more events (e.g., when a certain amount of monitored information is collected for the user), be triggered automatically (e.g., every time the user logs in with the digital receiver 102), or be manually triggers (e.g., the user indicates they want an updated favorites list).

In example embodiments, the validation module 210 performs operation 306. The validation module 210 may initially identify the content program associated with each action. For example, the validation module 210 accesses or retrieves a content viewing schedule from the schedule server 114 and use the content viewing schedule to identify the content program. In some embodiments, the validation module 210 aggregates the monitored information with respect to a same content program for a predetermined period of time (e.g., past month). The aggregated information includes an indication of a level of action performed with respect to the content program. The level of the actions may comprise an amount of time that a particular command is in effect with respect to the content program (e.g., an amount of time a view command is in effect indicating a length of time the content program was viewed, an amount of time a search result/browse result is viewed based on a command to search or browse), or a number of times that a particular command is selected with respect to the content program (e.g., a number of times a record command is received for the content program, a number of times a command to set a reminder to view the content program is received, a number of times a command to purchase or subscribe to the content program is received). The level of action is then compared to one or more predetermined thresholds by the validation module 210 to determine whether the threshold is met or transgressed.

In operation 308, a determination is made as to whether the level of action meets or exceeds the threshold. If one or more thresholds are met or transgressed, then in operation 310, the content program is marked as a favorites and a corresponding indication is stored. In some embodiments, any one of the thresholds being met or transgressed, as determined by the validation module 210, triggers the favorites generation module 212 to mark the content program as a favorites. In other embodiments, a combination of thresholds being met or transgressed is needed in order for the favorites generation module 212 to mark the content program as a favorites. The indication can be stored locally at the digital receiver 102 or stored remotely at the cloud server 108.

The monitoring module 208 continually monitors the user's actions in operation 304. Therefore, as the predetermined period of time (e.g., past month) shifts, the validation module 210 (e.g., at a predetermined interval, such as, weekly; based on an event; or when otherwise triggered) uses the newly collected monitored information for analysis in operation 306. This may result in a change in viewing, recording, reminder setting, browsing, searching, or purchase/subscription patterns for the user. As a result, a content program that was previously indicated to be a favorites may no longer be a favorites, and the indication is removed, by the favorites generation module 212, for that content program. Accordingly, the favorites generation module 212 may, in one embodiment, access a list of the indications of favorites in order to determine whether a previously stored indication should be removed for a content program that is no longer a favorites.

Figure 4:
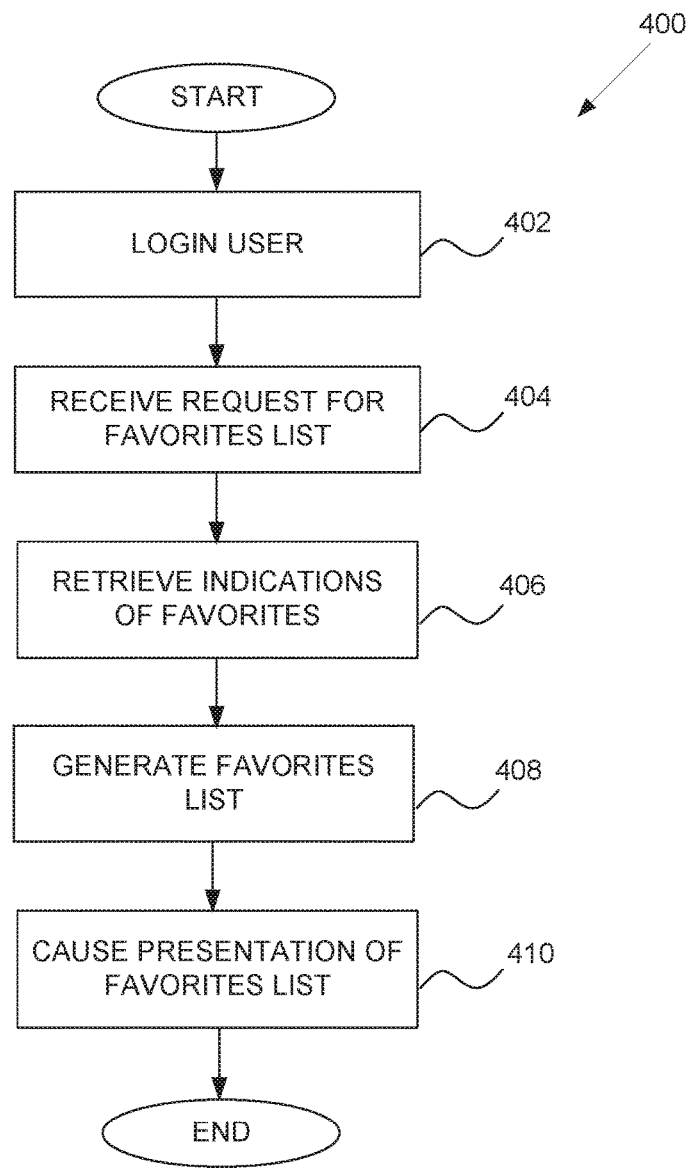
FIG. 4 is a flow diagram of an example method for providing a favorites list.

FIG. 4 is a flow diagram of an example method 400 for providing a favorites list. In some embodiments, the method 400 is performed in part or in whole by components of the digital receiver 102. Accordingly, the method 400 is described by way of example with reference to the digital receiver 102. However, it shall be appreciated that at least some of the operations of the method 400 may be deployed on various other hardware configurations or be performed by similar components residing on the cloud server 108. Therefore, the method 400 is not intended to be limited to the digital receiver 102.

In operation 302, the user logs in with (or otherwise identifies themselves to) the digital receiver 102 via the accounts module 204. In one embodiment, the user selects their profile from a list displayed by the digital receiver 102. The user may also be asked to provide login credentials (e.g., PIN, password). By logging in, the user has access to their favorites list either locally stored at the digital receiver 102 or at the cloud server 108. In some embodiments, the operation 402 may be operation 302.

In operation 404, a request for a favorites list is received. In example embodiments, the user may submit the request for the favorites list using a user interface provided displayed on the viewing device 104 by the user interface module 214 or via a remote control device associated with the receiver device 102.

In operation 406, the indications of favorites are retrieved. When the request for a favorites list is received from the user, the favorites generation module 212 accesses the stored indications of the favorites (e.g., a list of favorites) from a user profile of the user. In some embodiments, the indications of favorites is locally stored at the digital receiver 102 (e.g., at the data store 216). In other embodiment, the indications are not locally available at the digital receiver 102 and the favorites generation module 212 accesses the indications stored by the cloud server 108 (e.g., at the account data store 110) via the communications module 202.

In operation 408, the favorites list is generated. Once retrieved, the favorites generation module 212 dynamically generates the favorites list based on the latest indications stored in a user profile of the user. Because the indications are continually updated, the favorites list may change every time it is generated by the favorites generation module 212.

In operation 410, the favorites list is presented to the user in a user interface. In example embodiments, the user interface module 214 generates and causes display of a favorites (user) interface that displays the favorites list. The favorites interface may also comprise controls that allow the user to edit the favorites list.

Figure 5:
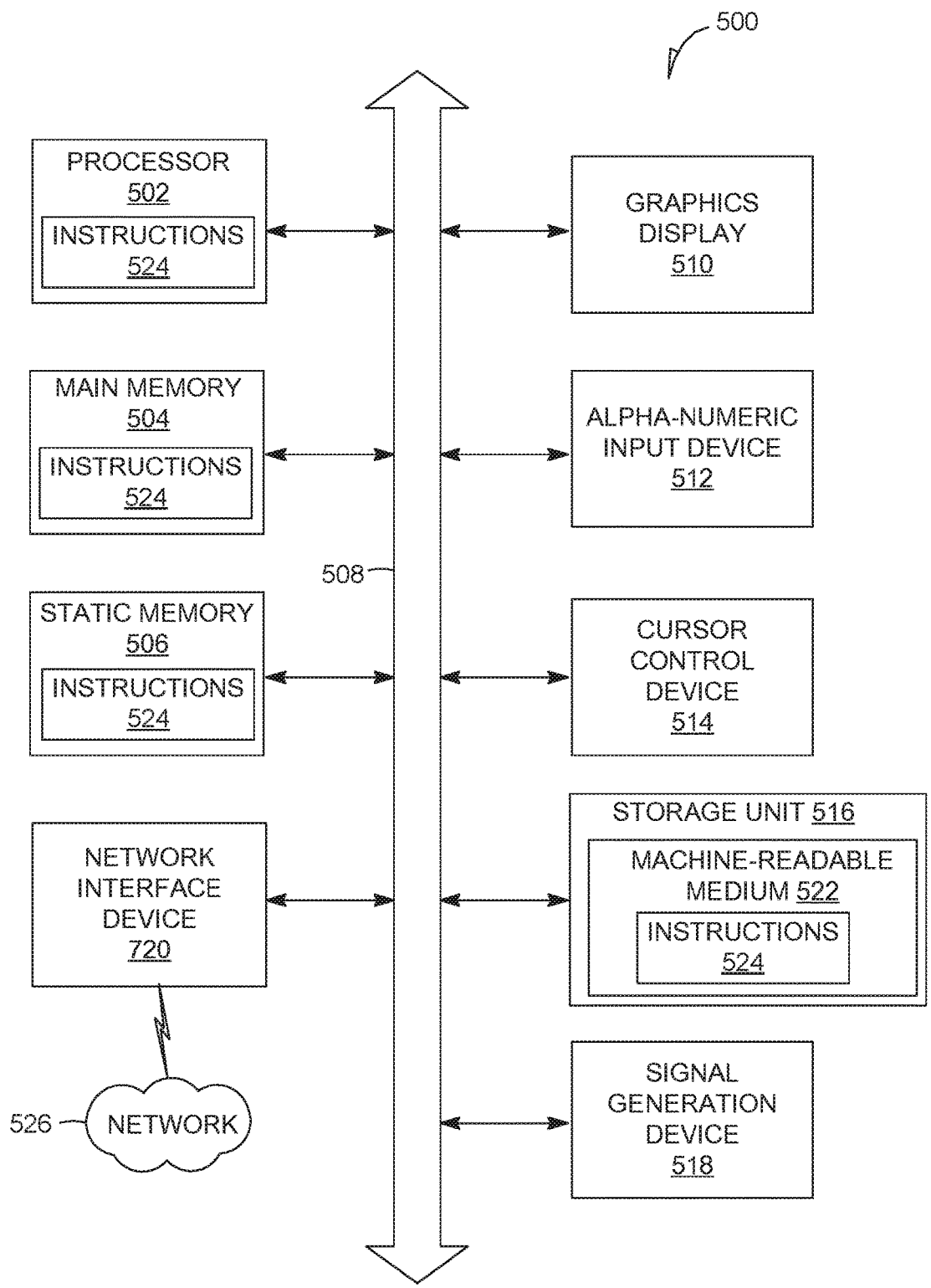
FIG. 5 is a simplified block diagram of a machine in an example form of a computing system within which a set of instructions for causing the machine to perform any one or more of the methodologies discussed herein may be executed.

FIG. 5 is a block diagram illustrating components of a machine 500, according to some example embodiments, able to read instructions 524 from a machine-readable medium 522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer device (e.g., a computer) within which the instructions 524 (e.g., software, a program, an application, an applet, an app, or other executable code) for causing the machine 500 to perform any one or more of the methodologies discussed herein may be executed, in whole or in part.

For example the instructions 524 may cause the machine 500 to execute the flow diagrams of FIGS. 3 and 4. The instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. The machine 500 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 500 capable of executing the instructions 524, sequentially or otherwise, that specify actions to be taken by that machine 500. Further, while only a single machine 500 is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a cursor control device 514 (e.g., a mouse, a touchpad, a trackball, a joystick, a motion sensor, an eye tracking device, or other pointing instrument), a storage unit 516, a signal generation device 518 (e.g., a sound card, an amplifier, a speaker, a headphone jack, or any suitable combination thereof), and a network interface device 520.

The storage unit 516 includes the machine-readable medium 522 (e.g., a tangible machine-readable storage medium) on which are stored the instructions 524 embodying any one or more of the methodologies or functions described herein. The instructions 524 may also reside, completely or at least partially, within the main memory 504, within the processor 502 (e.g., within the processor's cache memory), or both, before or during execution thereof by the machine 500. Accordingly, the main memory 504 and the processor 502 may be considered machine-readable media 522 (e.g., tangible and non-transitory machine-readable media).

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 522 able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions 524. The term "machine-readable medium" shall also be taken to include any medium, or combination of multiple media, that is capable of storing instructions 524 for execution by a machine (e.g., machine 500), such that the instructions 524, when executed by one or more processors of the machine 500 (e.g., processor 502), cause the machine 500 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 522 is non-transitory in that it does not embody a propagating or transitory signal. However, labeling the machine-readable medium 522 as "non-transitory" should not be construed to mean that the medium is incapable of movement—the medium should be considered as being transportable from one physical location to another. Additionally, since the machine-readable medium 522 is tangible, the medium may be considered to be a machine-readable device. Furthermore, the machine-readable medium 522 does not comprise any transitory signals.

The instructions 524 may further be transmitted or received over a communications network 526 using a transmission medium via the network interface device 520 and utilizing any one of a number of well-known transfer protocols (e.g., HTTP). Examples of communication networks 526 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 522 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 502 or a group of processors 502) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   monitoring, using one or more hardware processors, one or more actions performed by a user with respect to one or more content programs;
   automatically, without human intervention, analyzing, using one or more hardware processors, the one or more actions performed by the user with respect to the one or more content programs, the analyzing including determining whether a level of the one or more actions with respect to any of the one or more content programs satisfies a threshold;
   based on determining that the level of the one or more actions with respect to a first content program of the one or more content programs satisfies the threshold, automatically updating a data store to indicate that the first content program is a favorites content program; and
   based on determining that the level of the one or more actions with respect to a second content program of the one or more content programs does not satisfy the threshold, automatically updating the data store to indicate that the second content program is not a favorites content program.

2. The method of claim 1, wherein the first content program is the same as the second content program.

3. The method of claim 1, wherein:
   the determining that the level of the one or more actions with respect to the second content program does not satisfy the threshold comprises detecting a reduction in the level of the one or more actions with respect to the second content program, previously indicated to be a favorites content program, that results in the level of the one or more actions with respect to the second content program no longer satisfying the threshold; and
   based on the level of the one or more actions not satisfying the threshold, the updating the data store comprises automatically removing an indication that the second content program is a favorites content program from the data store.

4. The method of claim 1, wherein the level of the one or more actions with respect to the one or more content programs comprises an amount of time that a particular command is in effect with respect to each of the one or more content programs.

5. The method of claim 1, wherein the level of the one or more actions with respect to the one or more content programs comprises a number of times that a particular command is received with respect to each of the one or more content programs.

6. The method of claim 1, wherein:
   the one or more actions comprise one or more view commands to view the one or more content programs; and
   the threshold comprises an amount of time that the one or more view commands were in effect for a content program.

7. The method of claim 1, wherein:
   the one or more actions comprises one or more recording commands to record the one or more content programs; and
   the threshold comprises a number of times the one or more recording commands were received for a content program.

8. The method of claim 1, wherein:
the one or more actions comprises one or more commands to set a reminder to view the one or more content programs; and
the threshold comprises a number of times the one or more commands to set the reminder were received for a content program.

9. The method of claim 1, wherein:
the one or more actions comprises one or more commands to search or browse for a content program; and
the threshold comprise an amount of time a search result or browsing result for the content program is displayed for review by the user.

10. The method of claim 1, wherein:
the one or more actions comprises one or more commands to purchase or subscribe to a content program; and
the threshold comprises a number of times the one or more commands to purchase or subscribe to the content program was received.

11. The method of claim 1, wherein the first content program is different than the second content program.

12. The method of claim 1, further comprising:
receiving a request for a favorites list from the user;
retrieving, from the data store, indications of favorites content programs of the user;
using the indications of the favorites content programs, dynamically generating the favorites list; and
causing presentation of the favorites list on a viewing device to the user.

13. The method of claim 1, wherein the analyzing the one or more actions comprises:
accessing a content viewing schedule from a schedule server;
using the content viewing schedule to identify the one or more content programs corresponding to the one or more actions; and
aggregating the one or more actions with respect to each of the one or more content programs for a predetermined period of time.

14. A system comprising:
one or more processors; and
a memory storing instructions that, when executed by the one or more processors, causes the one or more processors to perform operations comprising:
monitoring one or more actions performed by a user with respect to one or more content programs;
automatically analyzing the one or more actions performed by the user with respect to the one or more content programs, the analyzing including determining whether a level of the one or more actions with respect to any of the one or more content programs satisfies a threshold;
based on determining that the level of the one or more actions with respect to a first content program of the one or more content programs satisfies the threshold, automatically updating a data store to indicate that the first content program is a favorites content program; and
based on determining that the level of the one or more actions with respect to a second content program of the one or more content programs does not satisfy the threshold, automatically updating the data store to indicate that the second content program is not a favorites content program.

15. The system of claim 14, wherein the first content program is the same as the second content program.

16. The system of claim 14, wherein:
the determining that the level of the one or more actions with respect to the second content program does not satisfy the threshold comprises detecting a reduction in the level of the one or more actions with respect to the second content program, previously indicated to be a favorites content program, that results in the level of the one or more actions with respect to the second content program no longer satisfying the threshold; and
based on the level of the one or more actions not satisfying the threshold, the updating the data store comprises automatically removing an indication that the second content program is a favorites content program from the data store.

17. The system of claim 14, wherein the level of the one or more actions with respect to the one or more content programs comprises an amount of time that a particular command is in effect with respect to each of the one or more content programs.

18. The system of claim 14, wherein the level of the one or more actions with respect to the one or more content programs comprises a number of times that a particular command is received with respect to each of the one or more content programs.

19. The system of claim 14, wherein the analyzing the one or more actions comprises:
accessing a content viewing schedule from a schedule server;
using the content viewing schedule to identify the one or more content programs corresponding to the one or more actions; and
aggregating the one or more actions with respect to each of the one or more content programs for a predetermined period of time.

20. A non-transitory machine-readable storing instructions that, when executed by one or more processors of a machine, causes the machine to perform operations comprising:
monitoring one or more actions performed by a user with respect to one or more content programs;
automatically analyzing the one or more actions performed by the user with respect to the one or more content programs, the analyzing including determining whether a level of the one or more actions with respect to any of the one or more content programs satisfies a threshold;
based on determining that the level of the one or more actions with respect to a first content program of the one or more content programs satisfies the threshold, automatically updating a data store to indicate that the first content program is a favorites content program; and
based on determining that the level of the one or more actions with respect to a second content program of the one or more content programs does not satisfy the threshold, updating the data store to indicate that the second content program is not a favorites content program.

* * * * *